US012530953B2

(12) United States Patent
Panindre et al.

(10) Patent No.: US 12,530,953 B2
(45) Date of Patent: Jan. 20, 2026

(54) ARTIFICIAL INTELLIGENCE-BASED AUTONOMOUS ALERT SYSTEM FOR REAL TIME REMOTE FIRE AND SMOKE DETECTION IN LIVE VIDEO STREAMS

(71) Applicants: New York University, New York, NY (US); New York University in Abu Dhabi Corporation, Abu Dhabi (AE)

(72) Inventors: Prabodh Panindre, Weehawkin, NJ (US); Shantanu Acharya, Jersey City, NJ (US); Kalidindi Nanda Kishore, Jersey City, NJ (US); Sunil Kumar, Abu Dhabi (AE)

(73) Assignees: New York University, New York, NY (US); New York University in Abu Dhabi Corporation, Abu Dhabi (AE)

( * ) Notice: Subject to any disclaimer, the term of this patent is extended or adjusted under 35 U.S.C. 154(b) by 0 days.

(21) Appl. No.: 18/091,218

(22) Filed: Dec. 29, 2022

(65) Prior Publication Data

US 2024/0096187 A1    Mar. 21, 2024

Related U.S. Application Data

(60) Provisional application No. 63/332,511, filed on Apr. 19, 2022.

(51) Int. Cl.
*G08B 17/12* (2006.01)
*G06V 20/40* (2022.01)
*G06V 20/52* (2022.01)

(52) U.S. Cl.
CPC .......... *G08B 17/125* (2013.01); *G06V 20/41* (2022.01); *G06V 20/52* (2022.01)

(58) Field of Classification Search
CPC ....... G08B 17/125; G06V 20/41; G06V 20/52
See application file for complete search history.

(56) References Cited

U.S. PATENT DOCUMENTS

| | | | |
|---|---|---|---|
| 2003/0141980 A1* | 7/2003 | Moore ................. | G08B 17/125 348/82 |
| 2017/0296855 A1* | 10/2017 | Williamson ....... | A62C 99/0081 |
| 2019/0279478 A1* | 9/2019 | Ebata ..................... | G06N 3/045 |
| 2021/0049789 A1* | 2/2021 | Bonn ..................... | G06V 20/52 |
| 2021/0110691 A1* | 4/2021 | Heinonen ............ | G08B 29/188 |
| 2022/0292829 A1* | 9/2022 | Li .......................... | G08B 17/10 |
| 2023/0169126 A1* | 6/2023 | Poston ................ | H04L 67/1004 707/737 |
| 2023/0298352 A1* | 9/2023 | Yun ....................... | H04N 23/45 348/159 |
| 2024/0005757 A1* | 1/2024 | Sun ....................... | G06V 10/56 |

* cited by examiner

*Primary Examiner* — Davetta W Goins
*Assistant Examiner* — Sharmin Akhter
(74) *Attorney, Agent, or Firm* — John C. Pokotylo; Pokotylo Patent Services

(57) ABSTRACT

State-of-the-art object detection algorithms (e.g., Efficient-Det, Faster-RCNN, and YOLO) and their variants are integrated into an end-to-end IoT cloud-based system deployment. The system can (1) receive real-time video streaming (RTSP/RTMP/SDP) from most CCTV systems and devices with cameras, (2) extract frames from the video streams, (3) feed the frames to multiple AI models simultaneously, and (4) compute a probability for the presence of fire and/or smoke. Based on custom risk thresholds, the outputs can be compiled programmatically into a video clip that is sent to a user automatically for real-time alerts.

18 Claims, 11 Drawing Sheets

ARTIFICIAL INTELLIGENCE-BASED AUTONOMOUS ALERT SYSTEM FOR REAL TIME REMOTE FIRE AND SMOKE DETECTION IN LIVE VIDEO STREAMS

§ 1. RELATED APPLICATIONS

This application claims the benefit of U.S. Provisional Patent Application Ser. No. 63/332,511 (referred to as "the '511 provisional" and incorporated herein by reference), filed on Apr. 19, 2022, titled "ARTIFICIAL INTELLIGENCE-BASED AUTONOMOUS ALERT SYSTEM FOR REAL-TIME REMOTE FIRE AND SMOKE DETECTION IN LIVE VIDEO STREAMS," and listing Prabodh PANINDRE, Shantanu ACHARYA, Kalidindi Nanda KISHORE, and Sunil KUMAR as the inventors. Each of the references cited in the '511 provisional is incorporated herein by reference. The present invention is not limited to requirements of the particular embodiments described in the '511 provisional.

§ 2. BACKGROUND

§ 2.1 Field of the Invention

The present application concerns alert systems and methods for remote fire and smoke detection. For example, the present application describes artificial intelligence-based autonomous alert systems and methods for real-time remote fire and smoke detection in live video streams.

§ 2.2 Background Information

In 2020, U.S. fire departments responded to an estimated 1,388,500 fires that caused 3,500 fatalities and 15,200 injuries of civilians, 64 on-duty deaths and 58,900 injuries of firefighters, and a loss of approximately $21.9 billion in property damage. (See, e.g., Ahrens, M. & Evarts, B. "Fire loss in the united states during 2020" (2021), incorporated herein by reference.) Importantly, four of every five fire deaths and three-quarters of injuries occurred in residential structure fires. The majority of the U.S. Fire Service (70% volunteer) are challenged continuously by the available resources in terms of manpower, equipment, and budgets while responding to structure fires in a timely manner. (See, e.g., Ahrens, M., "Home structure fires" (National Fire Protection Association, Fire Analysis and Research Division, 2013), incorporated herein by reference.)

Since the 1970s the number of structure fires per year has dropped more than 50%. Also, turnout gear is much better, the amount of training firefighters receive has increased, and firefighting equipment and technology have improved significantly. Based on these facts, many would believe that the fire-ground has become a safer place. Unfortunately, this has not happened. In fact, the rate of traumatic deaths on the fire-ground has increased from 1.8 per 100,000 fires during the 1970s to 3 per 100,000 today. (See, e.g., Fahy, R. F., "US fire service fatalities in structure fires," 1977-2009. NFPA Fire Analysis Res. Div. Quincy, Mass. (2010), incorporated herein by reference.)

Modern building materials & techniques, open layouts, and synthetic furnishings have adversely affected the fire dynamics when compared with their legacy predecessors. Cumulatively, these changes have resulted into faster fire propagation, rapid fire and smoke growth, shorter escape times, decreased time to flashover, shorter times to structural collapse, and a reduction in time available for effective fire-ground operations. (See, e.g., Kerber, S., "Analysis of changing residential fire dynamics and its implications on firefighter operational timeframes," Fire technology 48, 865-891 (2012), and Madrzykowski, D., Kerber, S., Kumar, S. & Panindre, P. Wind, "fire and high-rises," mechanical engineering 132, 22-27 (2010), each of which is, incorporated herein by reference.) Each year, structure fires cause more than 50% Line-of-Duty-Deaths (LODD) and fire-ground injuries of firefighters. (See, e.g., Brassell, L. D. & Evans, D. D., "Trends in firefighter fatalities due to structural collapse," NISTIR 7069 (2003), incorporated herein by reference.) As recommended by the National Institute for Occupational Safety Health (NIOSH) firefighter fatality investigation reports, fire service needs efficient tools that can improve their situational awareness and assist them with the strategic decision-making process on the fire-ground.

For structural fires, conventional methods of detection rely on fire and smoke detectors, whose limitations and efficacy primarily depend on the volume of smoke and proximity to the ignition location.

The present inventors have realized that an overlooked category is the image stream from the ubiquitous closed-circuit television (CCTV) systems or smart devices with cameras that are readily available in most of our built environments. The present inventors believe that when integrated with machine learning for image classification, these offer an efficient solution for remote real-time autonomous fire and smoke detection. The present inventors further believe that rapidly advancing capabilities of Artificial Intelligence (AI) computing techniques coupled with enhancements in communication and Internet of Things (IoT) platforms, the decreasing cost of wireless camera monitoring systems, and increasing ease to operate them make AI an ideal technology for mitigating the fire hazards. The present inventors have developed an AI-based IoT system for autonomous remote detection of fire and smoke (all five classes of fire designated by the National Fire Protection Association (NFPA), USA) using the live video streams from cameras, and notifying users (via email, messages, etc.). The user can verify the video clip of the fire detected by the system, and activate the alarm to alert others or take necessary actions as appropriate. Such early detection of fire and an appropriate response can mitigate the fire spread, enable firefighters to easily control and extinguish the fire, allow occupants to escape the structure immediately and away from the fire location, ease the search and rescue operation, reduce property damage, and avoid firefighter and civilian injuries and loss of lives.

§ 2.2.1 Literature Review

Conventional fire and smoke detectors are based on thermal and chemical sensors. These sensors are made for indoor environments, and require a considerable amount of detection time and volume of fire/smoke for alerting the occupants. Moreover, they are subject to failure if the system is not installed and maintained properly or located close to the fire location. As per the NFPA, 11% of the individuals that died in residential fires were not alarmed by the fire and smoke detectors. Additionally, 60% of fatalities in residential fires were caused in structures without smoke detectors (41%) or detectors that malfunctioned and did not alert the occupants (16%)[7]. (See, e.g., Ahrens, M., "Smoke alarms in US home fires" (National Fire Protection Association, Fire Analysis and Research Division, 2009), incorporated herein by reference.)

Due to advancements in AI, image processing, computer vision, and IoT platforms, the closed-circuit television (CCTV) systems or smart devices integrated with the camera that are readily available in most of our environments, offer an efficient solution for remote real-time autonomous fire and smoke detection. Conventional methods, such as motion detection, color segmentation, wavelet analysis, etc., to classify the fire and smoke are based on several features (such as color, shapes, movement, etc.) extracted from the input images or videos. (See, e.g., Saponara, S., Pilato, L. & Fanucci, L., "Early video smoke detection system to improve fire protection in rolling stocks," In Real-Time Image and Video Processing 2014, vol. 9139, 913903 (International Society for Optics and Photonics, 2014), Truong, T. X. & Kim, J.-M., "An early smoke detection system based on motion estimation," In International Forum on Strategic Technology 2010, 437/1/10 (IEEE, 2010), and Chen, T.-H., Yin, Y.-H., Huang, S.-F. & Ye, Y.-T., "The smoke detection for early fire-alarming system based on video processing," In 2006 international conference on intelligent information hiding and multimedia, pp. 427-430 (IEEE, 2006), each of which is incorporated herein by reference.)

Several researchers used the turbulent motion of smoke particles to detect pixels and classify the smoke. (See, e.g., Chen, T.-H., Yin, Y.-H., Huang, S.-F. & Ye, Y.-T., "The smoke detection for early fire-alarming system based on video processing," In 2006 international conference on intelligent information hiding and multimedia, pp 427-430 (IEEE, 2006), Maruta, H., Kato, Y., Nakamura, A. & Kurokawa, F., "Smoke detection in open areas using its texture features and time series properties," In 2009 IEEE International Symposium on Industrial Electronics, pp. 1904-1908 (IEEE, 2009), and Surit, S. & Chatwiriya, W., "Forest fire smoke detection in video based on digital image processing approach with static and dynamic characteristic analysis," In 2011 First ACIS/JNU International Conference on Computers, Networks, Systems and Industrial Engineering, 35-39 (IEEE, 2011), each of which is incorporated herein by reference.) As the fire develops, the smoke color changes from white (pyrolysis) to gray to black (incomplete combustion). Ochoa-Brito, et al. and Surit, et al. found color segmentation is a quicker and more reliable technique for smoke identification. (See, e.g., Surit, S. & Chatwiriya, W., "Forest fire smoke detection in video based on digital image processing approach with static and dynamic characteristic analysis," In 2011 First ACIS/JNU International Conference on Computers, Networks, Systems and Industrial Engineering, pp. 35-39 (IEEE, 2011), and Alejandro, O.-B., Leonardo, M.-G., Gabriel, S.-P., Karina, T.-M. & Mariko, N.-M., "Improvement of a video smoke detection based on accumulative motion orientation model," In 2011 IEEE Electronics, Robotics and Automotive Mechanics Conference, pp. 126-130 (IEEE, 2011), each of which is incorporated herein by reference.)

Modern advancements in computing hardware and processors have significantly increased the ability to analyze large amounts of data which further accelerated the development and use of machine learning techniques in various fields including medical diagnosis, autonomous vehicles, etc. The ability of Convolutional Neutral Networks (CNNs) to automatically learn and extract the complex image features, and classify the images has been used by several researchers for fire and smoke detection. (See, e.g., Muhammad, K., Ahmad, J., Mehmood, I., Rho, S. & Baik, S. W., "Convolutional neural networks based fire detection in surveillance videos," IEEE Access 6,18174-18183 (2018), Yin, Z., Wan, B., Yuan, F., Xia, X. & Shi, J., "A deep normalization and convolutional neural network for image smoke detection," IEEE Access 5, pp. 18429-18438 (2017), and Namozov, A. & Im Cho, Y., "An efficient deep learning algorithm for fire and smoke detection with limited data," Adv. Electr. Comput. Eng. 18, pp. 121-128 (2018), each of which is incorporated herein by reference.) Others have adopted the GoogleNet, Visual Geometry Group (VGG), Inception, ResNet, etc. to classify the whole input image to a single class (fire or no-fire). (See, e.g., Luo, Y., Zhao, L., Liu, P. & Huang, D., "Fire smoke detection algorithm based on motion characteristic and convolutional neural networks," Multimed. Tools Appl. 77, pp. 15075-15092 (2018), and Hu, Y. & Lu, X., "Real-time video fire smoke detection by utilizing spatial-temporal convnet features," Multimed. Tools Appl. 77,29283-29301 (2018), each of which is incorporated herein by reference.) These techniques do not identify the regions of smoke and fire in the input image, which, the present inventors believe, is important in the initial phases of fire and smoke when their size and shape are small, and affect the overall accuracy of the AI model.

Recently, object detection methods such as You Only Look Once (YOLO), Single Shot Detector (SSD), and R-CNN have been implemented to locate fire and smoke in the input image. (See, e.g., Wu, S. & Zhang, L., "Using popular object detection methods for real time forest fire detection," In 2018 11th International symposium on computational intelligence and design (ISCID), vol. 1, pp. 280-284 (IEEE, 2018), Li, P. & Zhao, W., "Image fire detection algorithms based on convolutional neural networks," Case Stud. Therm. Eng. 19, 100625 (2020), Lestari, D. P. et al., "Fire hotspots detection system on cctv videos using you only look once (yolo) method and tiny yolo model for high buildings evacuation," In 2019 2nd International Conference of Computer and Informatics Engineering (IC2IE), pp 87-92 (IEEE, 2019), and Shen, D., Chen, X., Nguyen, M. & Yan, W. Q., "Flame detection using deep learning," In 2018 4th International conference on control, automation and robotics (ICCAR), pp. 416-420 (IEEE, 2018), each of which is incorporated herein by reference.) Few researchers have integrated these object detection models in their custom hardware for autonomous fire and smoke classification. (See, e.g., Barmpoutis, P., Dimitropoulos, K. & Grammalidis, N., "Real time video fire detection using spatio-temporal consistency energy," In 2013 10th IEEE International Conference on Advanced Video and Signal Based Surveillance, pp. 365-370 (IEEE, 2013), and Saponara, S., Elhanashi, A. & Gagliardi, A., "Real-time video fire/smoke detection based on cnn in antifire surveillance systems," J. Real-Time Image Process. 18, pp. 889-900 (2021), each of which is incorporated herein by reference.) However, in these studies the dataset is limited to a specific type of fire such as wildland fires, vehicle fires, etc. Additionally, in some cases, the dataset includes a large number of similar images extracted from fire videos which can greatly affect the accuracy of the AI model.

§ 3. SUMMARY OF THE INVENTION

The present inventors have developed state-of-the-art object detection AI models (EfficientDet, Faster-RCNN, and YOLO) using a custom dataset comprising images representing all five classes of fire designated by NFPA, USA. (See, e.g., Reporter's guide: All about fire. Available at https://www.nfpa.org/News-and-Research/Publications-and-media/Press-Room/Reporters-Guide-to-Fire-and-NFPA/All-about-fire, NFPA, incorporated herein by reference.) The present inventors have developed an end-to-end IoT cloud-based solution that can receive real-time video streaming (RTSP/RTMP/SDP) from most CCTV systems and devices integrated with the camera, detect the presence of fire and smoke (including early-stage ignitions) using results from multiple AI models, and send automatic instant alerts (via email, SMS, etc.) in the form of a video clip of fire/smoke detection using which the user can act appropriately. Alternatively, or in addition, remedial actions can be triggered automatically.

The present application describes example computer-implemented method comprising: (a) receiving a video stream; (b) extracting frames from the video stream received; (c) feeding the extracted frames as input into at least one object detection model that has been trained to detect at least one of fire and/or smoke; (d) processing at least one detection output from the at least one object detection model to determine a probability of at least one of fire and/or smoke; (e) determining whether or not the probability of at least one of fire and/or smoke meets a predetermined condition; and (f) responsive to a determination that the probability of at least one of fire and/or smoke meets a predetermined condition, sending a user notification of an occurrence of fire and/or smoke.

In at least some of the example methods, the act of processing at least one detection output from the at least one (e.g., more than one) object detection model to determine a probability of at least one of fire and/or smoke includes determining whether or not a predetermined number of consecutive frames of video include at least one of fire and/or smoke, determining whether or not a predetermined number of consecutive frames of video include at least one of fire and/or smoke, and/or determining whether or not a predetermined percentage of frames of video include fire and/or smoke.

In at least some example methods, the act of processing at least one detection output from the at least one object detection model to determine a probability of at least one of fire and/or smoke includes (1) determining a bounding shape (e.g., a rectangle) around at least one of fire and/or smoke found in consecutive frames of video, and (2) determining whether or not an area(s) of the bounding shape(s) is changing (e.g., increasing) over time.

In at least some example methods, the user notification includes at least one image, or a link to at least one image from the extracted frames. In some such embodiments, the at least one image includes at least one bounding shape overlaying at least one of smoke and/or fire in the at least one image.

In at least some example methods, the user notification includes at least one video clip, or a link to at least one video clip from the extracted frames. In some such embodiments, the at least one video clip includes at least one bounding shape overlaying at least one of smoke and/or fire in the at least one video clip.

Some example methods further comprise training each of the at least one object detection to detect at least one of fire and/or smoke using a training set of images, at least some of which include smoke and/or fire. In some such embodiments, the training set of images includes a distribution of (i) Class A: Ordinary combustible materials, (ii) Class B: Flammable and combustible liquids, (iii) Class C: Class A or Class B involving energized electrical equipment, (iv) Class D: Combustible metals, and (v) Class K: Cooking appliance fires involving combustible cooking media. In some example embodiments, the training set of images is annotated with shapes bounding smoke and/or fire in the images.

In some example methods, each of the at least one object detection model has hyperparameters which are evolved from initial values by trying to maximize a fitness score over a number of iterations.

In some example methods, the at least one object detection model that has been trained to detect at least one of fire and/or smoke includes more than one object detection model (e.g., EfficientDet and YOLO).

The present application also describes example systems for performing the described methods. Some or all components of the example systems may be web-based and/or cloud-based. Alternatively, or in addition, some or all components of the example systems may be provided on local machines.

The present application also describes a non-transitory computer readable medium or multiple non-transitory computer-readable medium storing processor-executable instructions which, when executed by at least one processor, cause the at least one processor to perform the example methods described.

§ 4. BRIEF DESCRIPTION OF THE DRAWINGS

§ 5. DETAILED DESCRIPTION

The present description may involve novel methods, apparatus, message formats, and/or data structures for providing (e.g., artificial intelligence-based) autonomous alerts for real-time remote fire and smoke detection in live video streams. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§ 5.1 Example Methods

Figure 1:
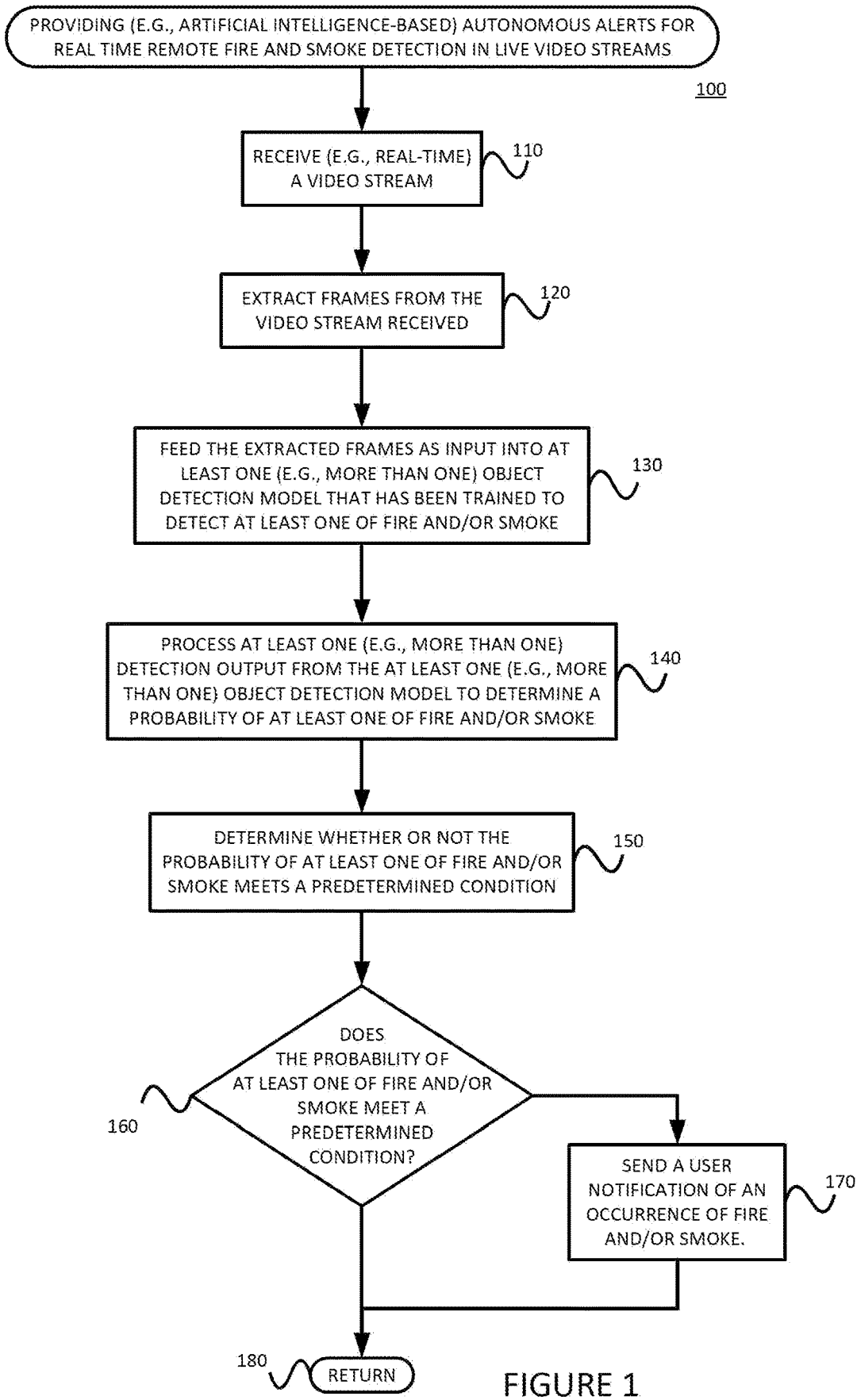
FIG. 1 is a flow diagram of an example method consistent with the present description.

FIG. 1 is a flow diagram of an example method 100 consistent with the present description. The example method 100 receives a (e.g., real-time) video stream (Block 110) and extracts frames from the video stream received (Block 120). The example method 100 then feeds the extracted frames as input into at least one (e.g., more than one) object detection model that has been trained to detect at least one of fire and/or smoke. (Block 130) The example method 100 then processes at least one (e.g., more than one) detection output from the at least one (e.g., more than one) object detection model to determine a probability of at least one of fire and/or smoke. (Block 140) The example method 100 then determines whether or not the probability of at least one of fire and/or smoke meets a predetermined condition. (Block 150) Responsive to a determination that the probability of at least one of fire and/or smoke meets a predetermined condition (Decision 160=YES), the example method 100 sends a user notification of an occurrence of fire and/or smoke (Block 470), before the example method 100 is left (Node 180). If, on the other hand, it is determined that the probability of at least one of fire and/or smoke does not meet a predetermined condition (Decision 160=NO), the example method 100 is left (Node 180).

Referring back to block 140, in at least some example implementations, the act of processing at least one (e.g., more than one) detection output from the at least one (e.g., more than one) object detection model to determine a probability of at least one of fire and/or smoke includes determining whether or not a predetermined number (e.g., at least 2) of consecutive frames of the video include fire. Still referring to block 140, in at least some other example implementations, the act of processing at least one (e.g., more than one) detection output from the at least one (e.g., more than one) object detection model to determine a probability of at least one of fire and/or smoke includes determining whether or not a predetermined number (e.g., at least 2) of consecutive frames of the video include smoke. In yet other example implementations, the act of processing at least one (e.g., more than one) detection output from the at least one (e.g., more than one) object detection model to determine a probability of at least one of fire and/or smoke includes determining whether or not a predetermined number (e.g., at least 2) of consecutive frames of the video include both fire and smoke.

Still referring back to block 140, in at least some example implementations, the act of processing at least one (e.g., more than one) detection output from the at least one (e.g., more than one) object detection model to determine a probability of at least one of fire and/or smoke includes (1) determining a bounding shape (e.g., rectangle) around smoke found in consecutive frames of video, and (2) determining whether or not an area of the bounding shape is changing (e.g., increasing) over time. In at least some other example implementations, the act of processing at least one (e.g., more than one) detection output from the at least one (e.g., more than one) object detection model to determine a probability of at least one of fire and/or smoke includes (1) determining a bounding shape (e.g., rectangle) around fire found in consecutive frames of video, and (2) determining whether or not an area of the bounding shape is changing (e.g., increasing) over time. In at least some other example implementations, the act of processing at least one (e.g., more than one) detection output from the at least one (e.g., more than one) object detection model to determine a probability of at least one of fire and/or smoke includes (1) determining a first bounding shape (e.g., rectangle) around fire found in consecutive frames of video, (2) determining a second bounding shape (e.g., rectangle) around smoke found in consecutive frames of video, and (3) determining whether or not areas of both the first bounding shape and the second bounding shape are changing (e.g., increasing) over time.

Referring back to block 170, in at least some example implementations, the user notification includes at least one image, or a link to at least one image from the extracted frames. In some such example implementations, the at least one image includes at least one bounding shape overlaying at least one of smoke and/or fire in the at least one image. In at least some other example implementations, the user notification includes at least one video clip, or a link to at least one video clip from the extracted frames. In some such example implementations, the at least one video clip includes at least one bounding shape overlaying at least one of smoke and/or fire in the at least one video clip.

Referring back to block 140, in at least some example implementations, the example method may further include training each of the at least one (e.g., more than one) object detector to detect at least one of fire and/or smoke using a training set of images, at least some of which include smoke and/or fire. In at least some such implementations, the training set of images includes a distribution of (i) Class A: Ordinary combustible materials, (ii) Class B: Flammable and combustible liquids, (iii) Class C: Class A or Class B involving energized electrical equipment, (iv) Class D: Combustible metals, and (v) Class K: Cooking appliance fires involving combustible cooking media. In some implementations, the training set of images is annotated with appropriate bounding shapes (e.g., rectangles).

Still referring to block 140, in some example implementations of the example method 100, each of the at least one (e.g., more than one) object detection model has hyperparameters that are evolved from initial values by trying to maximize a fitness score over a number of iterations.

Further example methods and implementations consistent with the present description are described in § 5.3.1 below.

§ 5.2 Example Apparatus

Figure 2:
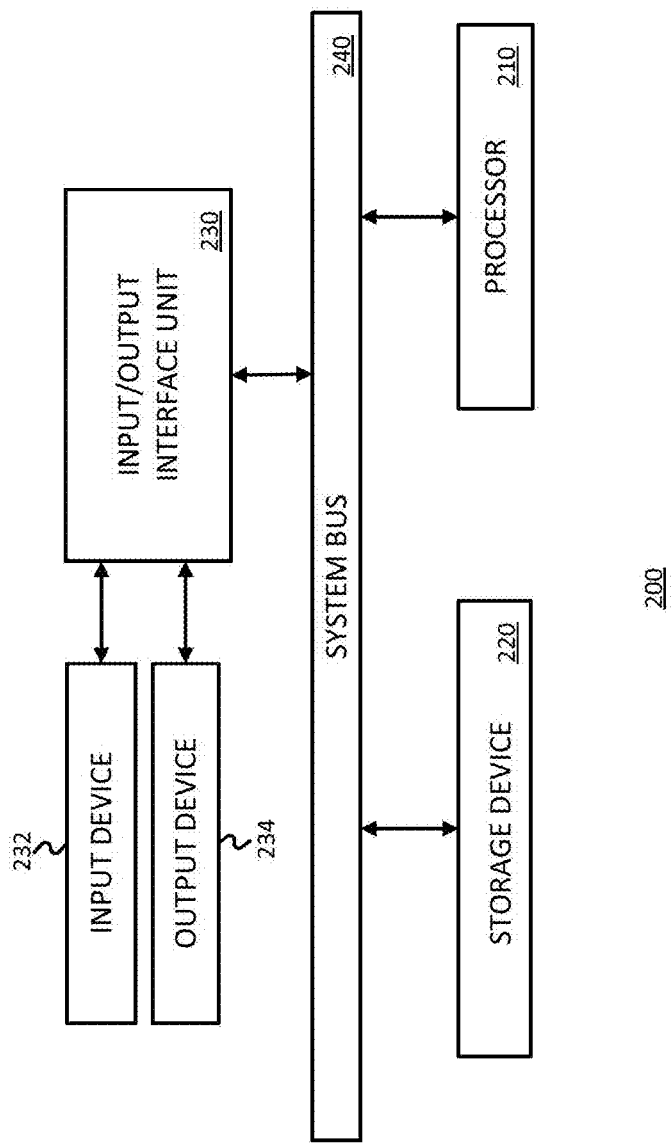
FIG. 2 is a block diagram of a device that may be used to implement some or all aspects of the example methods, and store some or all data, consistent with the present description.

FIG. 2 is a block diagram of a device 200 which may be used to implement some or all aspects of the example methods consistent with the present description. FIG. 2 is a block diagram of an exemplary machine 200 that may perform one or more of the methods described, and/or store information used and/or generated by such methods. The exemplary machine 200 includes one or more processors 210, one or more input/output interface units 230, one or more storage devices 220, and one or more system buses and/or networks 240 for facilitating the communication of information among the coupled elements. One or more input devices 232 and one or more output devices 234 may be coupled with the one or more input/output interfaces 230.

The one or more processors 210 may execute machine-executable instructions (e.g., C or C++ running on the Linux operating system widely available from a number of vendors) to perform one or more aspects of the present description. At least a portion of the machine executable instructions may be stored (temporarily or more permanently) on the one or more storage devices 220 and/or may be received from an external source via one or more input interface units 230. The machine executable instructions may be stored as various software modules, each module performing one or more operations. Functional software modules are examples of components of the present description.

In some embodiments consistent with the present description, the processors 210 may be one or more microprocessors and/or ASICs. The bus 240 may include a system bus. The storage devices 220 may include system memory, such as read only memory (ROM) and/or random access memory (RAM). The storage devices 220 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present description may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present description may be downloaded as a computer program that may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present description (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present description (or components or modules thereof) might be implemented as stored program instructions executed by at least one processor. Such hardware and/or software might be provided on a cloud server, in a server, a laptop computer, desktop computer, a tablet computer, a mobile phone, and/or any device that has computing and networking capabilities.

§ 5.3 Refinements, Alternatives, and Extensions

§ 5.3.1 Example Cloud Service Implementations

An end-to-end IoT cloud-based system deployment for real-time autonomous fire and smoke detection has been developed by integrating the models developed and described below. The system is packaged up in docker containers. The example deployment architecture (See FIG. 3.) is mainly divided into three major components: (1) image and/or video input; (2) fire and smoke detection using the object detection models developed; and (3) user notification.

Figure 3:
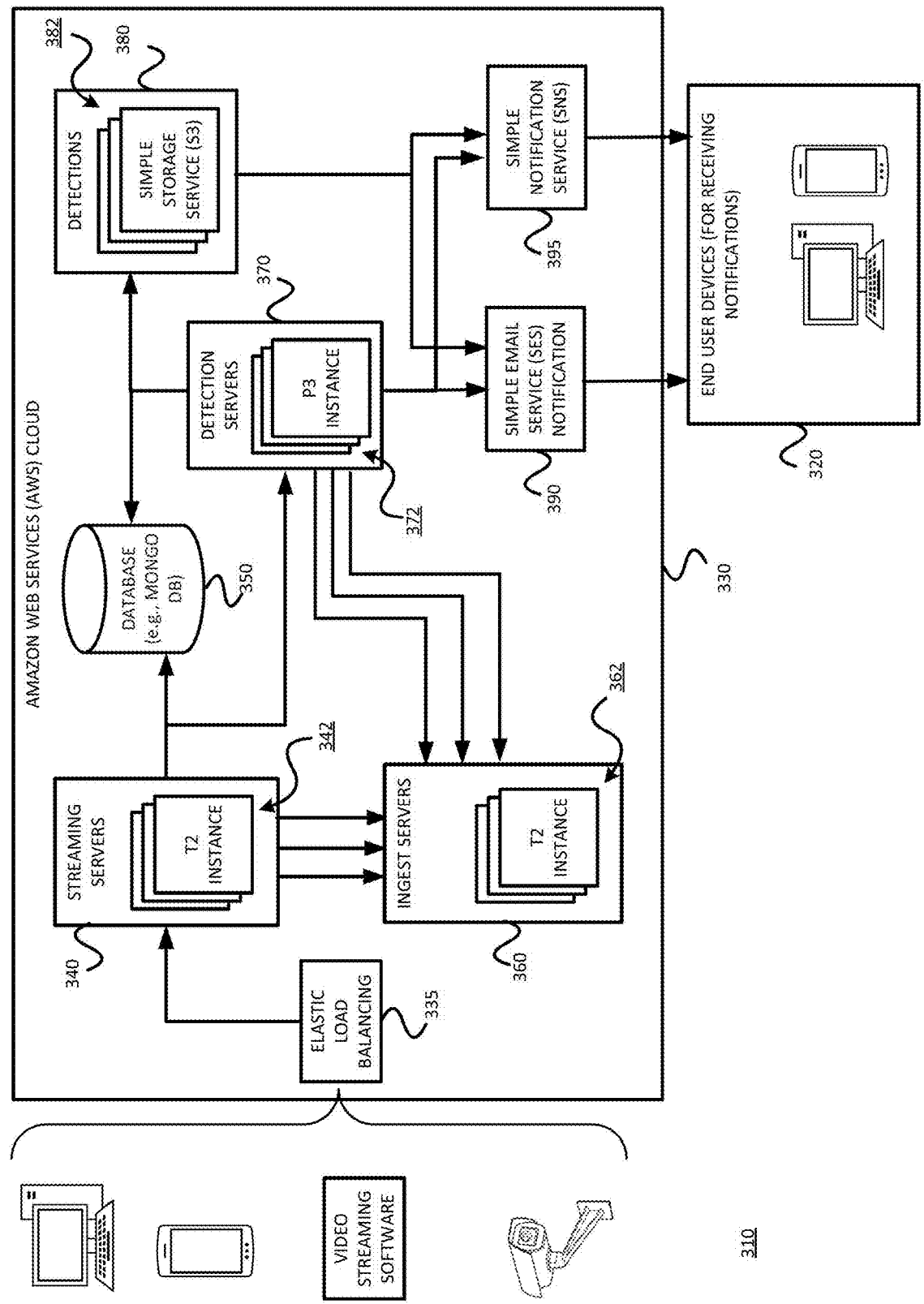
FIG. 3 is a block diagram of an example web-based deployment consistent with the present invention.
Figure 4:
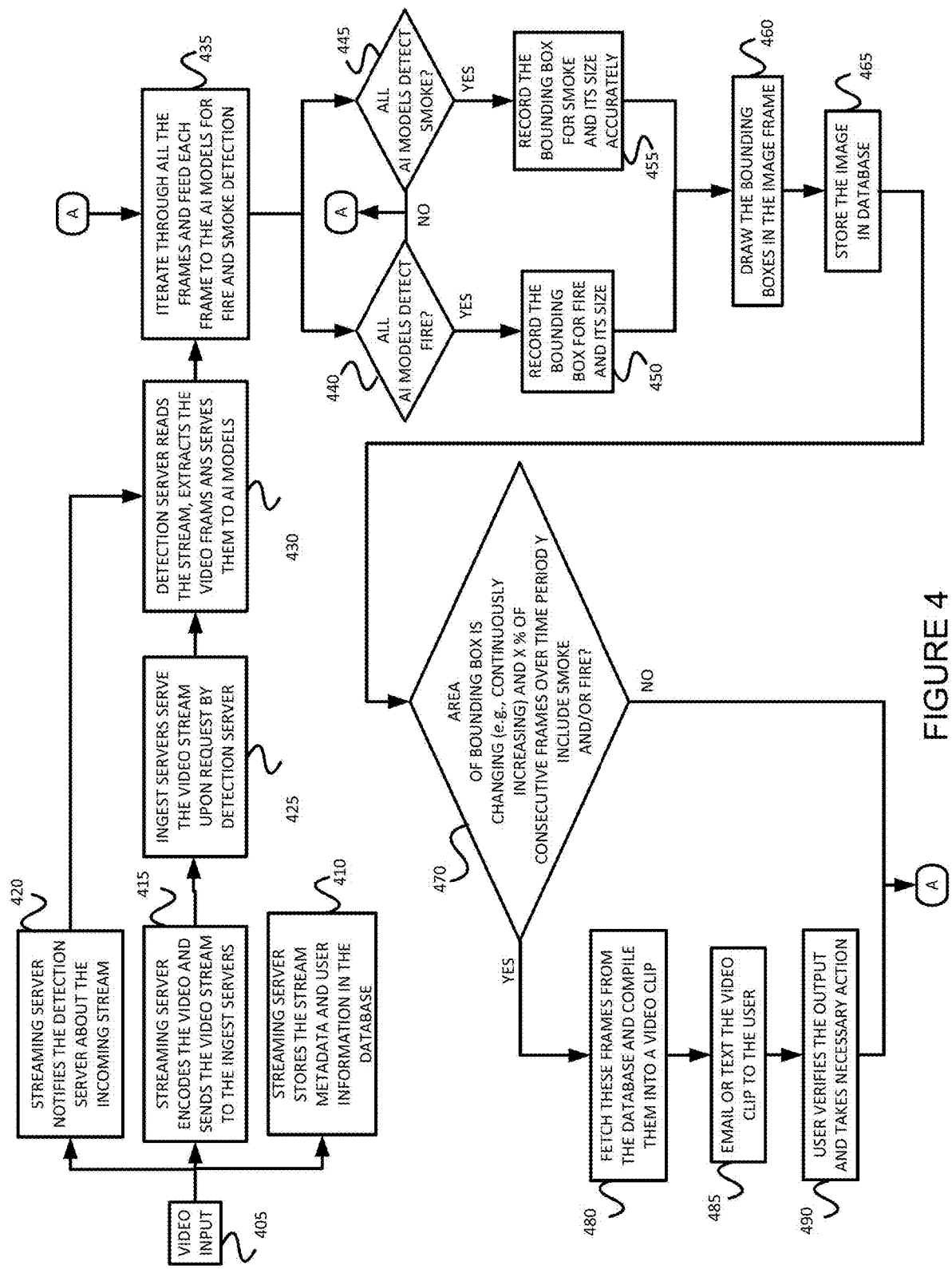
FIG. 4 is a flow diagram of operations performed by the web-based deployment of FIG. 3.

Referring to FIGS. 3 and 4, in the first component, the video stream from mobile phones, web cameras, streaming software, IP cameras, or any other device integrated with camera 310 is fed to streaming servers 340 for further processing. Note that the incoming traffic of video streams from devices 310 may be distributed automatically using an elastic load balancer 335, and then fed to the streaming servers 340. As most mobile phones and web cameras do not support publishing encoded video streams, the streaming servers 340 encode the videos 405 to the preferred format and publish them to ingest servers 340 (Block 415), for example using Real-Time Messaging Protocol (RTMP) protocol. Devices with built-in encoders (e.g., IP cameras) can ideally publish directly to the ingest servers 340 that are also routed via central streaming servers for possible metadata capture. (Block 410) Serving the video input to ingest servers directly can reduce the latency, which is important for scalability and quicker outputs. In the example deployment of FIG. 3, the streaming servers 340 are T2 instances 342 on the Amazon Web Services (AWS) 330 EC2 service that store the stream metadata and the user information in a database 350, such as MongoDB for example. The streaming servers 340 publish the stream to Ingest Servers 360 which are also T2 instances 362. The detection servers 370 consume the encoded stream from the ingest servers 360 for the purpose of detection. The streaming servers 340 also notify the detection servers 370 of the upcoming stream so that it can get ready to perform detection. (Block 420)

In the second component, as the detection servers 370 read the streams from the ingest servers 340, they extract frames from the input streams, and feed each frame to the object detection models 380. (Block 430) The object detection models 380 perform fire and/or smoke detection (and generate bounding boxes) using the received frame(s). (Blocks 435, 440, 445, 450, and 455).

As described below, since Faster-RCNN does not give better performance both in terms of mAP and detection speed as shown in Tables 4 and 5, Scaled-YOLOv4 and EfficientDet-D2 have been used for deployment. For a given frame, if both the models detect fire with a probability higher than the risk threshold only then the presence of fire in the frame is confirmed by the system. (Block 435, Decision 440=YES) To avoid false alarms, if both or any of the models do not detect the fire in a given frame, then the frame is not used in the final output. (Block 435, Decision 440=NO) The bounding boxes generated by Scaled-YOLOv4 were found to be more accurate and precise as compared to the respective predictions of EfficientDet-D2. Hence, once both the models agree on the presence of fire in a given frame (Block 435, Decision 440=YES), the bounding box(es) generated by Scaled-YOLOv4 are used for notifying the user. (Blocks, 450, 460, 480, 485, and 490) Similar logic has been implemented for confirming and notifying the detection of smoke. (Blocks 435, Decision 445, and Blocks 455, 460, 465, 480, 485, and 490) Fire and smoke may or may not be present together in the given frame (especially, in the initial stages of fire). Therefore, in this example deployment, the user will be notified if either fire or smoke has been detected by both models. (Decision 440=YES or Decision 445=YES)

These detection results are stored in AWS S3 Buckets 382 based on the stream key and stream index stored in the database 350. The detection servers 380 are P3 instances 382 to provide for GPU enabling fast inference.

The live video stream may include a static image of fire (for example, a fire picture hung up on a wall) or similar objects in the surroundings, which may be detected by the present AI models and create false alarms. To avoid such false detections, the algorithm may be tuned in such a way that it can differentiate between a real or live fire and a static image of a fire (or similar objects) present in the video stream. This was implemented by tuning the algorithm to consider the size of fire and smoke. More specifically, during inception, the size of the fire and smoke are initially small, and they continue to change (and, for example, increase) with time. The example algorithm used in the example deployment records the size of the fire and smoke by measuring the area of the bounding box of the fire and smoke obtained from the model. (Blocks 450 and 455) Based on the frame rate of the video stream, if the example algorithm detects that the total area of the bounding boxes for fire or smoke is changing (e.g., increasing) for a predetermined amount (e.g., a predetermined number such as 30 frames, or a predetermined percent such as 80%) of the frames in a certain time (Decision 470=YES), only then it confirms that a real or live fire is present in the video stream, and take further action (Blocks 480, 485 and 490). The bounding boxes for static images of fire (or similar objects) do not change or increase continuously. (Decision 470=NO) Thus, this technique helped the example deployment to significantly eliminate false detections.

The output from both AI models (run by detection servers 380) might or might not agree for all consecutive frames in the video stream. Therefore, in the final third component, if a predetermined amount (e.g., 80%) of the consecutive frames over a certain time period are reported to have fire and/or smoke with a probability more than the risk threshold by both models, then all output frames of the corresponding time period are combined programmatically to develop a video clip that is automatically emailed and texted to the end-user, preferably in real-time. (Block 485) This is accomplished by triggering the notification channels 390, 395 to simultaneously fetch the detection results stored in the S3 Buckets 382. In the example deployment, the notification channels 390, 395 are implemented using Amazon Simple Notification Service (SNS) 395 for sending messages and Amazon Simple Email Service (SES) 390 for sending emails. Upon receiving notification, the user 320 can take actions as needed or desired (such as triggering an alarm to alert others), or can ignore the message if the output video clip has false output. (Block 490) The user 320 is requested to verify the output (Block 490) Feedback from the user may be used to further improve the models and accuracy of the system. Alternatively, or in addition, remedial actions may be triggered automatically, without user intervention.

§ 5.3.2 Example Convolution Neural Networks (CNN) Implementations

As noted above, the example deployment 300 the detection server(s) 340 can use different models for fire and/or smoke detection. (Recall Block 435) With the rapid advancement of Artificial Intelligence, using neural networks for automated identification in images and videos has become the industry standard. Convolution Neural Networks (CNN) have proven to be quite effective for object detection tasks. The present inventors have trained, tested, and optimized several CNN-based object detection models to detect fire and smoke from images and videos. Different CNN-based object detection models are described in more detail below.

§ 5.3.2.1 EfficientDet

Figure 5:
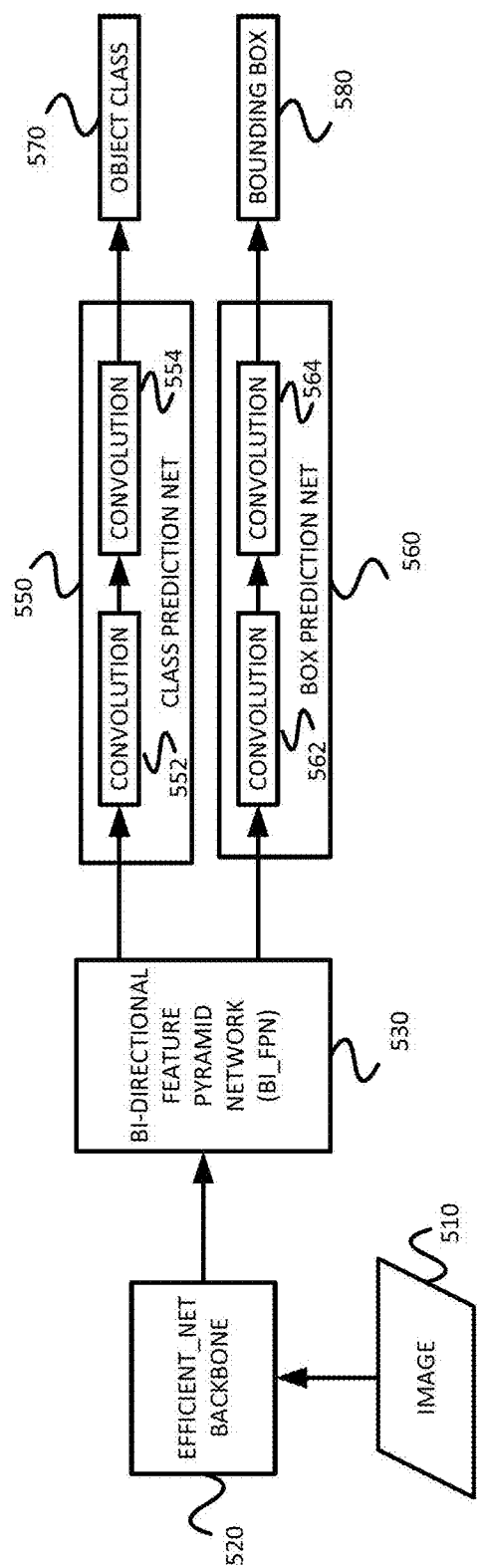
FIG. 5 is a block diagram of components of an EfficientDet CNN.

The EfficientDet is a fast and highly accurate detector that uses the EfficientNet architecture as its backbone. (See, e.g., Tan, M., Pang, R. & Le, Q. V., "Efficientdet: Scalable and efficient object detection," CoRR abs/1911.09070 (2019). 1911.09070, and Tan, M. & Le, Q. V., "Efficientnet: Rethinking model scaling for convolutional neural networks," CoRR abs/1905.11946 (2019). 1905.11946., each of which is incorporated herein by reference.) As shown in FIG. 5, the backbone 520 takes the image 510 as input and produces feature maps. These feature maps are sent to a Bi-directional Feature Pyramid Network (BiFPN) 530 with learnable weights to determine the importance of each input feature map. The BiFPN 530 acts as a feature network that produces fused features that are fed to convolution-based class network 550 and box network 560 to detect the object class 570 and bounding box 580, respectively. Similar to the compound scaling used in EfficientNets, the EfficientDet network also uses a principled scaling approach to scale the entire model which creates a family of EfficientDet detectors.

The present inventors developed models of several variants of EfficientDet on a test dataset (described later). All the variants were first pre-trained on Common Object in Context (COCO) Dataset. (See, e.g., Lin, T. et al. Microsoft COCO: common objects in context. CoRR abs/1405.0312 (2014). 1405.0312. (incorporated herein by reference).) and then fine-tuned on our fire and smoke dataset for 300 epochs with Stochastic Gradient Descent (SGD) optimizer. As the present inventors moved from EfficientDet-DO to more complex variants, the mean Average Precision (mAP@0.5:0.95) kept on improving, but it also started showing signs of overfitting. At the D3 variant, the mAP dropped quite considerably, and the training results showed strong signs of overfitting. This might be because of the increased complexity of the D3 variant and the relative simplicity of our dataset compared to the COCO dataset. Because of this strong overfitting trend, the present inventors decided not to test other more complex variants of EfficientDet.

§ 5.3.2.2 Faster-RCNN

Figure 6:
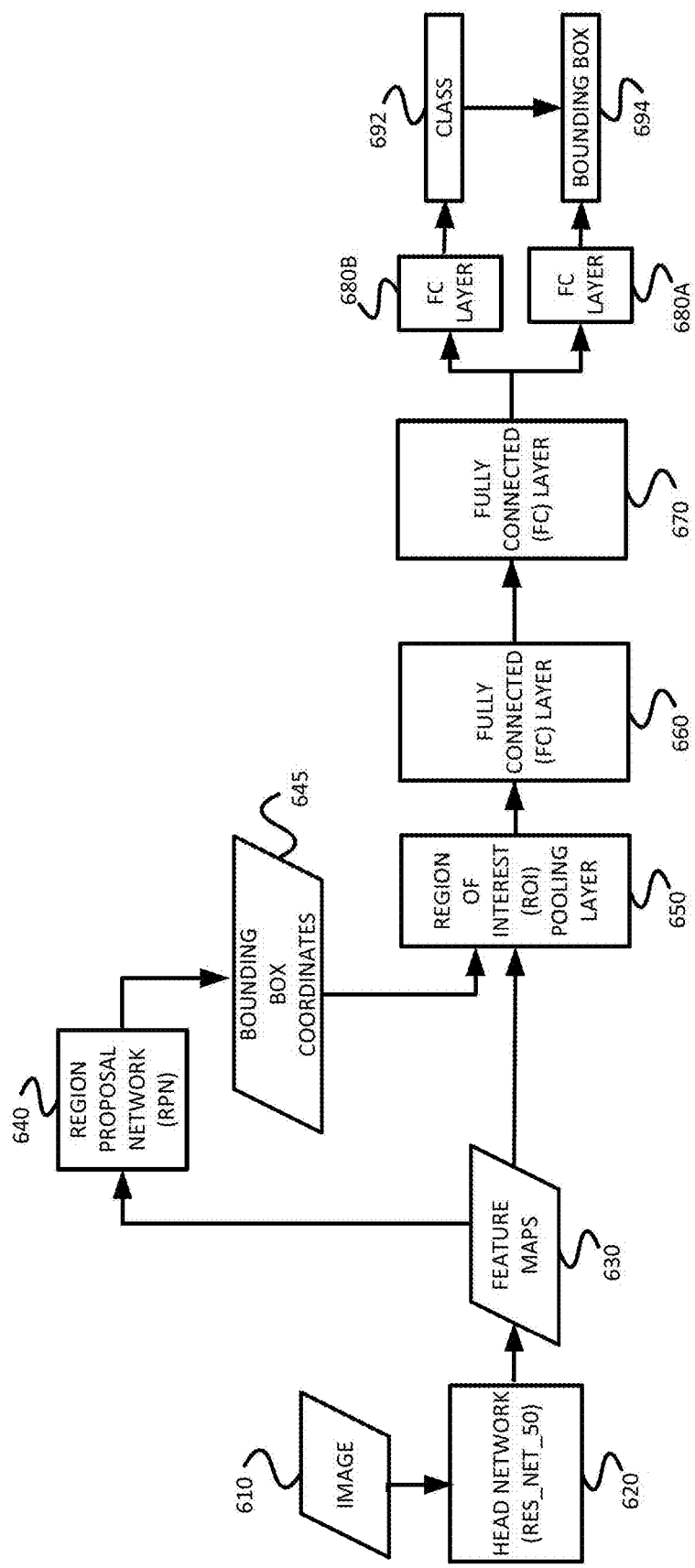
FIG. 6 is a block diagram of components of a Faster-RCNN.

The Faster-RCNN model (See, e.g., Ren, S., He, K., Girshick, R. B. & Sun, J., "Faster R-CNN: towards real-time object detection with region proposal networks," CoRR abs/1506.01497 (2015). 1506.01497, incorporated herein by reference.) is a two-stage detection algorithm that comprises three main types of networks called (1) the Head network, (2) the Region Proposal Network (RPN), and (3) the Classification network. As shown in FIG. 6, the Head network 620 takes the image 610 as input, applies a series of convolution operations on it and generates feature maps 630. In tests, the inventors used ResNet50 (See, e.g., He, K., Zhang, X., Ren, S. & Sun, J., "Deep residual learning for image recognition," CoRR abs/1512.03385 (2015). 1512.03385, incorporated herein by reference.) as the head network 620. The feature maps 630 generated by the head network 620 are taken by the RPN 640 which then generates several region proposals, each having an objectness score. The feature maps 630 and the output of the RPN 640 are then sent to a Region of Interest (ROI) pooling layer 650 which applies spatial transformations on the feature maps 630 given the bounding box coordinates 645 produced by the RPN 640. A classification layer takes the output of the ROI pooling layer 650 and passes it through two fully connected (FC) layers 660 and 670. The output from these two fully connected layers is sent to two, parallel, fully connected layers in which the first FC layer 680A produces the class scores for each bounding box while the second FC layer 680B produces class-specific bounding box regression coefficients which are combined with the bounding box coordinates given by the RPN to produce the final bounding boxes 694.

In one test, the present inventors first pre-trained Faster-RCNN on the COCO dataset and then fine-tuned it for their fire and smoke dataset. The model was trained for 150 epochs with a batch size of 16 and SGD optimizer with an initial learning rate of 0.003 which was dropped by 10% after the 120$^{th}$ epoch. The present inventors also added an L2 regularization penalty of 0.0005 to avoid overfitting.

§ 5.3.2.3 YOLO

One of the biggest issues with the Faster-RCNN network is that, at the present time (2021) it is very slow for use in real-time object detection through video inputs. This is primarily because of its two-step detection phase. For real-time object detection, YOLO networks (v3, v4 and scaled v4) are considerably faster than Faster-RCNN because of their one-step detection nature. These YOLO networks obtain mAP which is very close to the one obtained by Faster-RCNN, but perform object detection with great speed. This makes them the ideal architectures to be used in real-time object detection systems. The present inventors developed models of three (3) variants of the YOLO architecture: (1) YOLOv3, (2) YOLOv4, and (3) Scaled-YOLOv4. These variants are described in §§ 5.3.2.3.1-5.3.2.3.3 below.

§ 5.3.2.3.1 YOLOv3

Figure 7:
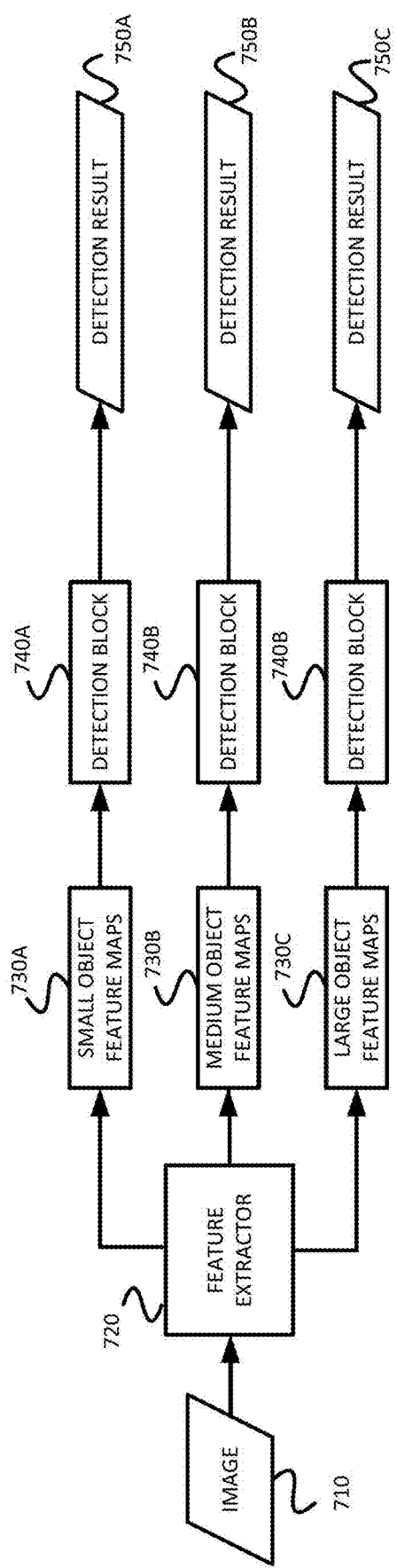
FIG. 7 is a block diagram of components of a YOLO CNN.

Referring to FIG. 7, YOLOv3 (See, e.g., Redmon, J. & Farhadi, A., "Yolov3: An incremental improvement," CoRR abs/1804.02767 (2018). 1804.02767, incorporated herein by reference.) uses the Darknet-53 architecture as its feature extractor 720 with three prediction heads 730A, 730B, and 730C. Each of these three prediction heads 730A, 730B, and 730C is passed through a respective detection block 740A, 740B, and 740C to generate detection results 750A, 750B, and 750C, respectively. This helps YOLOv3 output bounding boxes of various sizes to detect objects of all sizes in an image 710. Each prediction head produces a feature map that contains three (3) anchor boxes which makes a total of nine (9) anchor boxes in the entire YOLOv3 architecture. The three (3) feature maps are 8, 16, and 32 times down sampled from the original image to detect small, medium, and larger objects, respectively. YOLOv3 uses independent sigmoid functions to predict multilabel classification for each bounding box. This is useful in situations where fire and smoke appear simultaneously in the same region of the image.

§ 5.3.2.3.2 YOLOv4

YOLOv4 (See, e.g., Bochkovskiy, A., Wang, C. & Liao, H. M., "Yolov4: Optimal speed and accuracy of object detection," CoRR abs/2004.1093 (2020). 2004.10934, incorporated herein by reference.) is a significant improvement over YOLOv3 both in terms of accuracy as well as speed. It uses the Cross Stage Partial Darknet53 (CSPDarknet53) architecture as its backbone to extract feature maps from the input images and Path Aggregation Network (PANet) (See, e.g., Liu, S., Qi, L., Qin, H., Shi, J. & Jia, J., "Path aggregation network for instance segmentation," CoRR abs/1803.01534 (2018). 1803.01534, incorporated herein by reference.) for the feature aggregation of the network. Additionally, YOLOv4 also uses the Spatial Pyramid Pooling (See, e.g., He, K., Zhang, X., Ren, S. & Sun, J., "Spatial pyramid pooling in deep convolutional networks for visual recognition," CoRR abs/1406.4729 (2014). 1406.4729., incorporated herein by reference.) after the backbone to increase its receptive field and to separate the important features from the feature maps. Apart from the architectural improvements, YOLOv4 also uses two other techniques—Bag of Freebies and Bag of Specials—to improve its performance. The Bag of Freebies improves the performance without increasing the inference time in production. It is implemented by applying several data augmentations while training the model. The Bag of Specials adds a marginal overhead to the inference time but gives a significant improvement in performance. It is implemented by using the Mish (See, e.g., Misra, D., "Mish: A self-regularized non-monotonic neural activation function," CoRR abs/1908.08681 (2019). 1908.08681, incorporated herein by reference.) activation function, DIoU NMS (See, e.g., Zheng, Z. et al., "Distance-iou loss: Faster and better learning for bounding box regression," CoRR abs/1911.08287 (2019). 1911.08287, incorporated herein by reference.), and CmBN and DropBlock regularization (See, e.g., Ghiasi, G., Lin, T. & Le, Q. V., "Dropblock: A regularization method for convolutional networks," CoRR abs/1810.12890 (2018). 1810.12890, incorporated herein by reference.)

§ 5.3.2.3.3 Scaled-YOLOv4

Scaled-YOLOv4 (See, e.g., Wang, C., Bochkovskiy, A. & Liao, H. M., "Scaled-yolov4: Scaling cross stage partial network," CoRR abs/2011.08036 (2020). 2011.08036., incorporated herein by reference.) builds upon the YOLOv4 model with several optimizations, and shows significant jumps in speed and accuracy. The present inventors used the same backbone as the one in YOLOv4 as the feature extractor. The CSPs are added to the PAN which acts as the feature aggregation network. During training, the model is initially trained without any of the augmentations. Then, the trained model is fine-tuned with data augmentations. These optimizations seem to be more effective and thus make the Scaled-YOLOv4 technique the best performing YOLO variant. Within Scaled-YOLOv4, there are three (3) variants—P5, P6, and P7—depending upon their number of detection heads where each detection head predicts four (4) bounding boxes. P5, P6, and P7 contain 3, 4, and 5 detection heads which enable them to predict 12, 16, and 20 bounding boxes at once, respectively. In experiments by the present inventors, Scaled YOLOv4 P5 gave the best results, while the more complex models such as P6 and P7 resulted in overfitting on the training dataset.

Initially, each variant of YOLO was first pre-trained on the COCO dataset and then fine-tuned on our fire and smoke dataset. All the models were trained on a batch size of 32 with SGD optimization for 300 epochs. Since YOLO requires its inputs to have a fixed image size, all the input images were resized to 640×640 pixels before feeding them to the models. Additionally, the template anchor boxes were optimized, and the hyperparameter evolution was performed to customize the hyperparameters for our dataset (discussed below) and to ensure the most effective training for all the YOLO variants.

§ 5.3.2.3.4 CUSTOM ANCHOR BOXES

YOLOv3 and YOLOv4 use nine (9) anchor boxes and Scaled-YOLOv4 uses twelve (12) anchor boxes to detect objects in an image. The original anchor boxes given by the authors were designed to detect a variety of objects. However, for the current application(s), the model had to detect only fire and smoke from an image. Therefore, the inventors decided to create custom-sized anchor boxes tuned to their dataset.

To find the dimensions of the template anchor boxes for our dataset, the bounding box dimensions of the images in the training set were first normalized by dividing them by their respective image dimensions so that they are within the range [0, 1]. After normalization, the height and width of each bounding box were sent to the k-Means algorithm which divided those boxes into n clusters where n can be either nine (9) or twelve (12) depending on the YOLO variant. The centroid for each of the clusters was considered as the template anchor box dimension. The obtained dimensions were unnormalized by multiplying them by 640 which is the size of the input image given to the model. While this approach showed improvement with YOLOv3 and YOLOv4, it failed to show any improvement in Scaled-YOLOv4's performance and resulted in slight overfitting.

§ 5.3.2.3.5 Hyperparameter Evolution

Optimized values of hyperparameters play a huge role in the performance of neural networks. All YOLO variants constitute many hyperparameters and manually evaluating optimum values for all hyperparameters can be challenging. The present inventors used a hyperparameter evolution algorithm specified in the paper, Wang, C., Bochkovskiy, A. & Liao, H. M., "Scaled-yolov4: Scaling cross stage partial network," CoRR abs/2011.08036 (2020). 2011.08036 (incorporated herein by reference), which starts off with a base set of values and improves upon them for several generations.

A fitness score was defined to evaluate the performance of a generation. This score is a weighted sum of metrics for mAP@0.5 and mAP@0.5:0.95 with mAP@0.5 having a weight of 10% and mAP@0.5:0.95 having a weight of 90%. For the base set of values, the present inventors used the corresponding pre-trained YOLO model on the COCO dataset as our base model and fine-tuned it on our own dataset during evolution. The default initial values for the hyperparameters are kept the same as they were when the model was trained on the COCO dataset.

The algorithm starts off with the initial values and tries to maximize the fitness score after every generation. The algorithm runs the model for 300 generations, wherein for each generation, the model is trained for 10 epochs. The main genetic operators are mutation and crossover. The algorithm uses mutation with a 90% probability and 0.04 variance to create a new offspring based on a combination of the best parents from all the previous generations. This approach improved the performance of YOLOv3 and YOLOv4 models significantly. However, the mAP@5:0.95 value of Scaled-YOLOv4 showed no improvement.

§ 5.4 Experimental Results

The example cloud-based implementations, described above with reference to FIGS. 3 and 4, were tested using different parameters and different CNNs. The experimental results are discussed in this section. First, however, the dataset used in the experiments is described in § 5.4.1.

§ 5.4.1 Dataset

Based on fuel type, the NFPA classifies fires into five main types: (1) Class A: Ordinary combustible materials, (2) Class B: Flammable and combustible liquids, (3) Class C: Class A or Class B involving energized electrical equipment, (4) Class D: Combustible metals, and (5) Class K: Cooking appliance fires involving combustible cooking media. Approximately, 13,000 images were downloaded from Google images ensuring equal distribution of images in all five classes of fires. These raw images were quite noisy and were not in a proper format for them to be fed into the model for training directly. Therefore, the present inventors ran all the images through various preprocessing scripts for cleaning. Those preprocessing steps included removing duplicate or similar images, removing images to keep a balance of images from each of the five classes of fire, removing images having a lot of text, cleaning corrupt images, etc. The final dataset included 7545 images that included the distribution of all classes of fires. The images in the final dataset were annotated manually with appropriate bounding boxes.

The annotated dataset was split into training, validation, and test sets to train the final model. Table 1 shows the distribution of the dataset. Before training the models on our dataset, they were first pre-trained on the Common Object in Context (COCO) Dataset. (See, e.g., Lin, T. et al., "Microsoft COCO: common objects in context," CoRR abs/1405.0312 (2014). 1405.0312. (incorporated herein by reference).) COCO is a huge dataset that comprises annotated photos of everyday scenes of common objects in their natural context. It contains 328,000 images containing objects spanning across 80 different categories. Pre-training the models on this dataset helps the convolution layers to recognize patterns, textures, and objects from everyday image scenes. Thus, the kernels do not need to learn the basics of extracting features from images from the beginning and provide faster convergence when the pre-trained models are finally trained on our fire and smoke dataset.

TABLE 1

| Configuration of Dataset | |
|---|---|
| Dataset | Number of Images |
| Training | 6035 |
| Validation | 755 |
| Test | 755 |

§ 5.4.2 Creating and Training the Various CNN Models

The PyTorch (See, e.g., Paszke, A. et al., "Pytorch: An imperative style, high-performance deep learning library." In Wallach, H. et al. (eds.) Advances in Neural Information Processing Systems 32, 8024-8035 (Curran Associates, Inc., 2019), (incorporated herein by reference).) framework was used to create and train the models. The training was performed on a Linux server with 32 GB memory and an Nvidia Quadro RTX8000 GPU with 48 GB GDDR6 VRAM. The performance of the various CNN models tested are provided in § 5.4.3 below.

§ 5.4.3 Performance of Various CNN Models

§ 5.4.3.1 Performance of Efficientdet

Figure 8B:
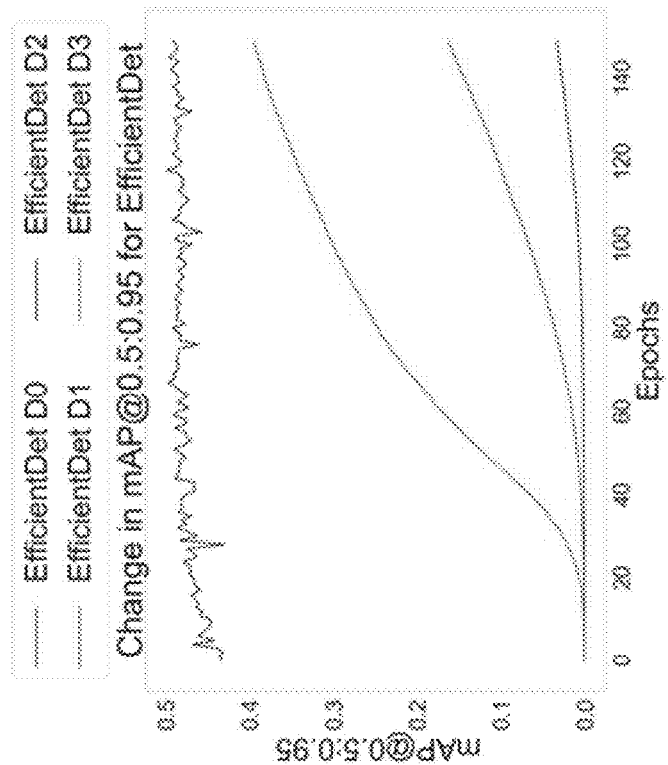
FIGS. 8A and 8B show the change in validation mean Average Precision (mAP) for each of the detectors while training.
Figure 8A:
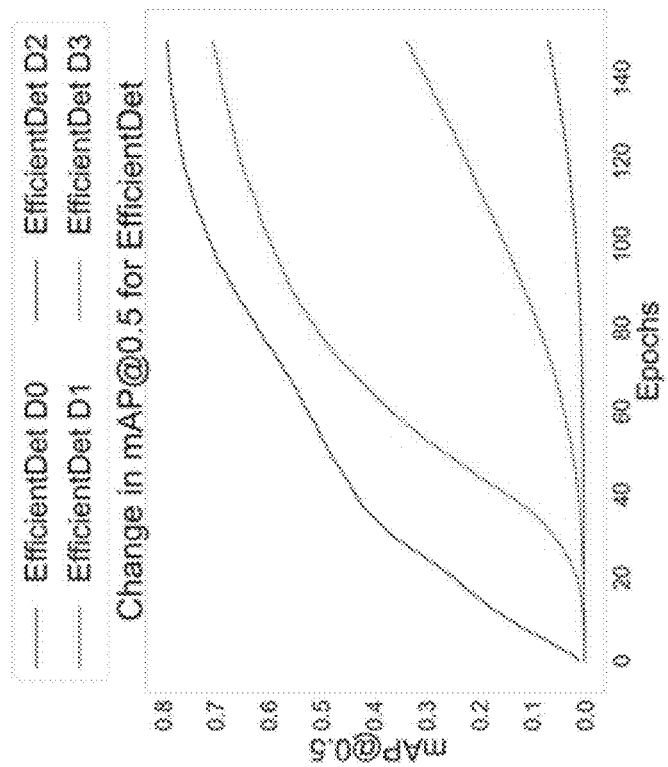

In their study, the present inventors found EfficientDet-D2 to be the best-performing model among all the EfficientDet detectors. Table 2 shows the mAP values obtained for each of the variants, and FIGS. 8A and 8B show the change in validation mAP for each of the detectors while training.

TABLE 2

| Performance of EfficientDet Detectors | | |
|---|---|---|
| Model | $mAP_{0.5}$ | $mAP_{0.5:0.95}$ |
| EfficientDet-D0 | 77.5 | 48.9 |
| EfficientDet-D1 | 76.9 | 49.1 |
| EfficientDet-D2 | 78.1 | 49.7 |
| EfficientDet-D3 | 75.9 | 49.3 |

§ 5.4.3.2 Performance of Yolo

Figure 9A:
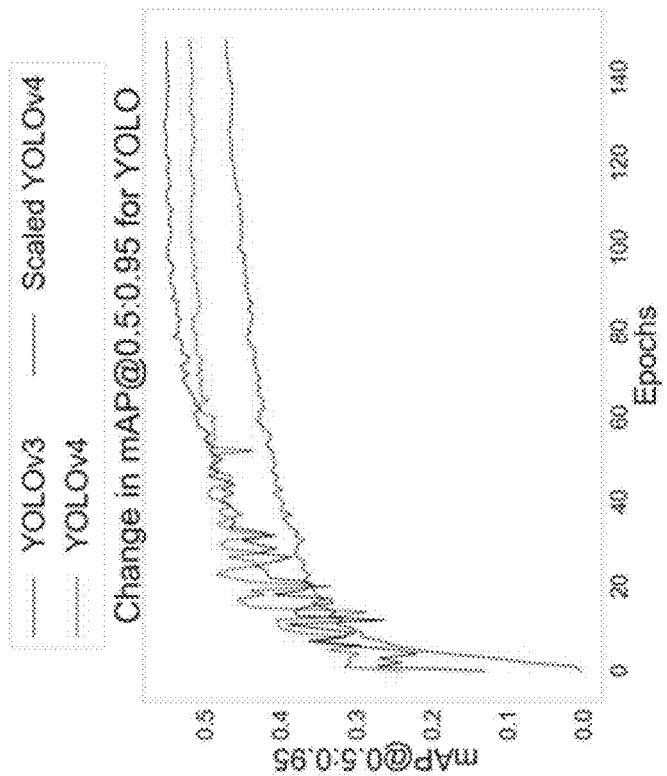
FIGS. 9A and 9B show mAP across different YOLO variants.
Figure 9B:
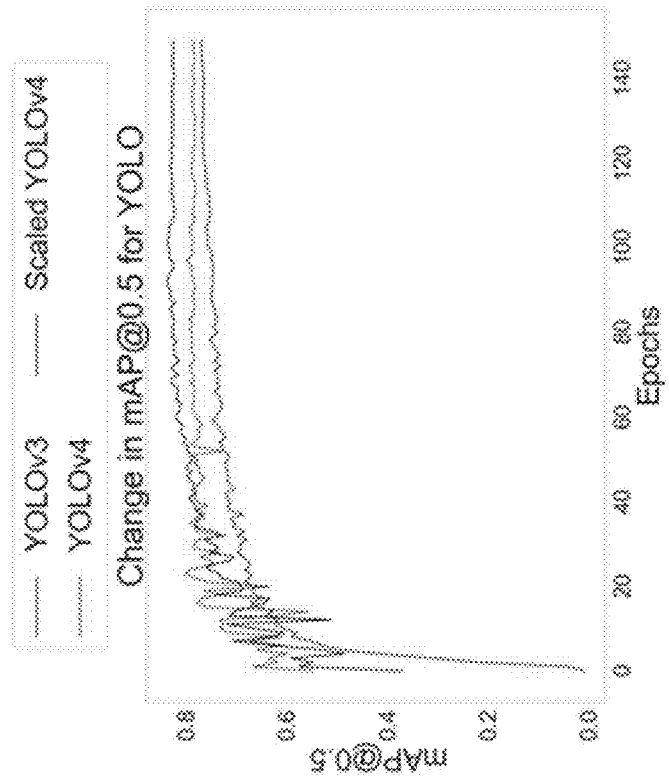

Table 3 shows the mAP values for YOLOv3 and YOLOv4 with custom template anchor boxes and evolved hyperparameters, and the mAP values for Scaled-YOLOv4 without any of the customizations mentioned above. From Table 3 and FIGS. 9A and 9B, it can be seen that Scaled YOLOv4 gives the best mAP across all YOLO variants.

TABLE 3

Performance of YOLO Detectors

| Model | $mAP_{0.5}$ | $mAP_{0.5:0.95}$ |
|---|---|---|
| Scaled-YOLOv4 | 80.6 | 52 |
| YOLOv4 | 75.4 | 48.9 |
| YOLOv3 | 74.8 | 46.1 |

§ 5.4.3.3 PERFORMANCE OF Faster-RCNN

The mAP obtained by training Faster-RCNN was not better when compared to EfficientDet-D2 and Scaled YOLOv4. In fact, the mAP obtained by Faster-RCNN was the lowest among all the models trained with our dataset.

§ 5.4.3.4 Relative Performances of Various Cnns

Figures 10A, 10B:
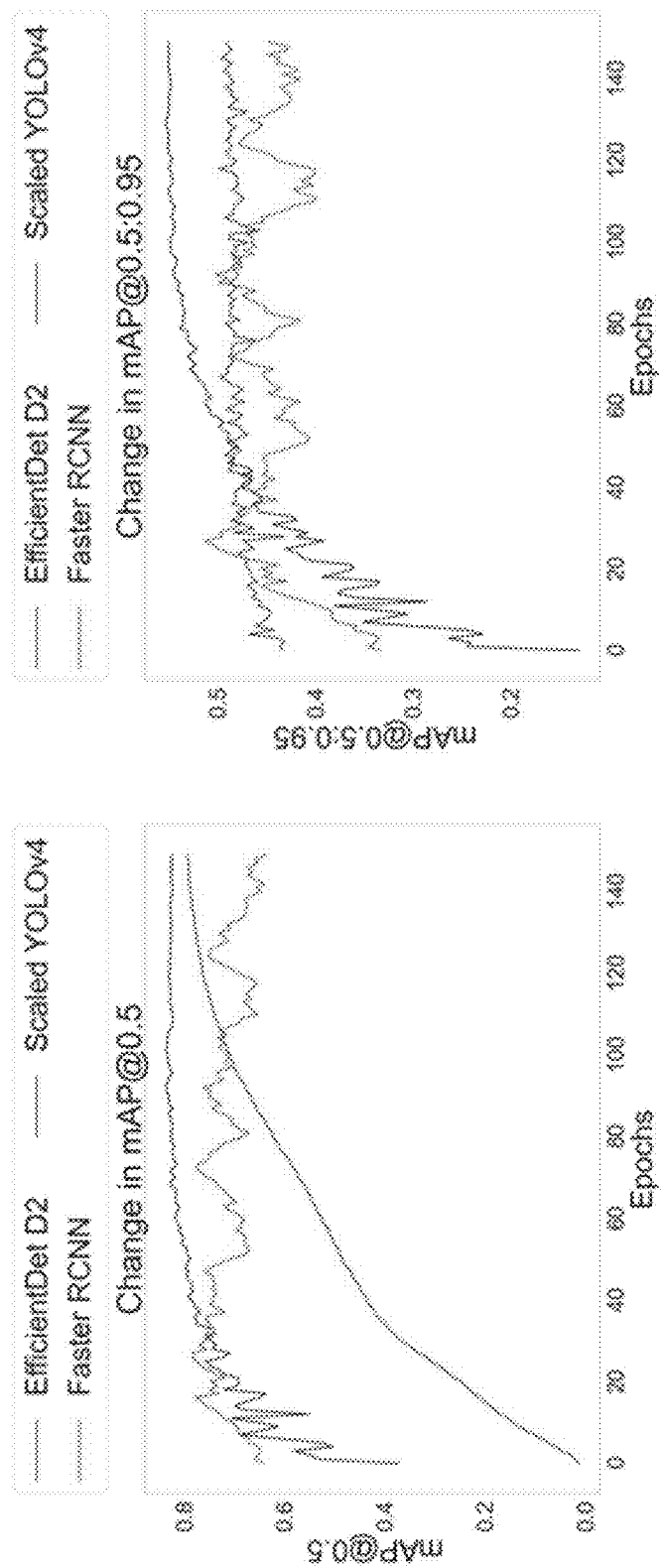
FIGS. 10A and 10B illustrate mAP values of Faster-RCNN compared with the mAPs of the best object detectors in EfficientDet and YOLO techniques.

In Table 4 and the FIGS. 10A and 10B, the mAP values of Faster-RCNN are compared with the mAPs of the best object detectors in EfficientDet and YOLO techniques, and Table 5 compares the average time taken by each of these detectors to detect fire and smoke per image or video frame. It is found that Scaled YOLOv4 and EfficientDet are the fastest and most accurate object detection models. Therefore, the present inventors believe that these are the most practical AI techniques to be integrated into the IoT system for detecting fire and smoke from images and video streams in real-time.

TABLE 4

Comparison of mAP values for Various Object Detector Techniques

| Model | $mAP_{0.5}$ | $mAP_{0.5:0.95}$ |
|---|---|---|
| Scaled-YOLOv4 | 80.6 | 52 |
| EfficientDet-D2 | 78.1 | 49.7 |
| Faster-RCNN | 67.8 | 35.3 |

TABLE 5

Comparison of Average Object Detection Times per image or frame by Various Detectors

| Model | Average Detection (per image or frame) |
|---|---|
| Scaled-YOLOv4 | 0.016 seconds |
| EfficientDet-D2 | 0.019 seconds |
| Faster-RCNN | 0.054 seconds |

§ 5.4.3.5 Image Outputs of Various CNNs

Figure 11:
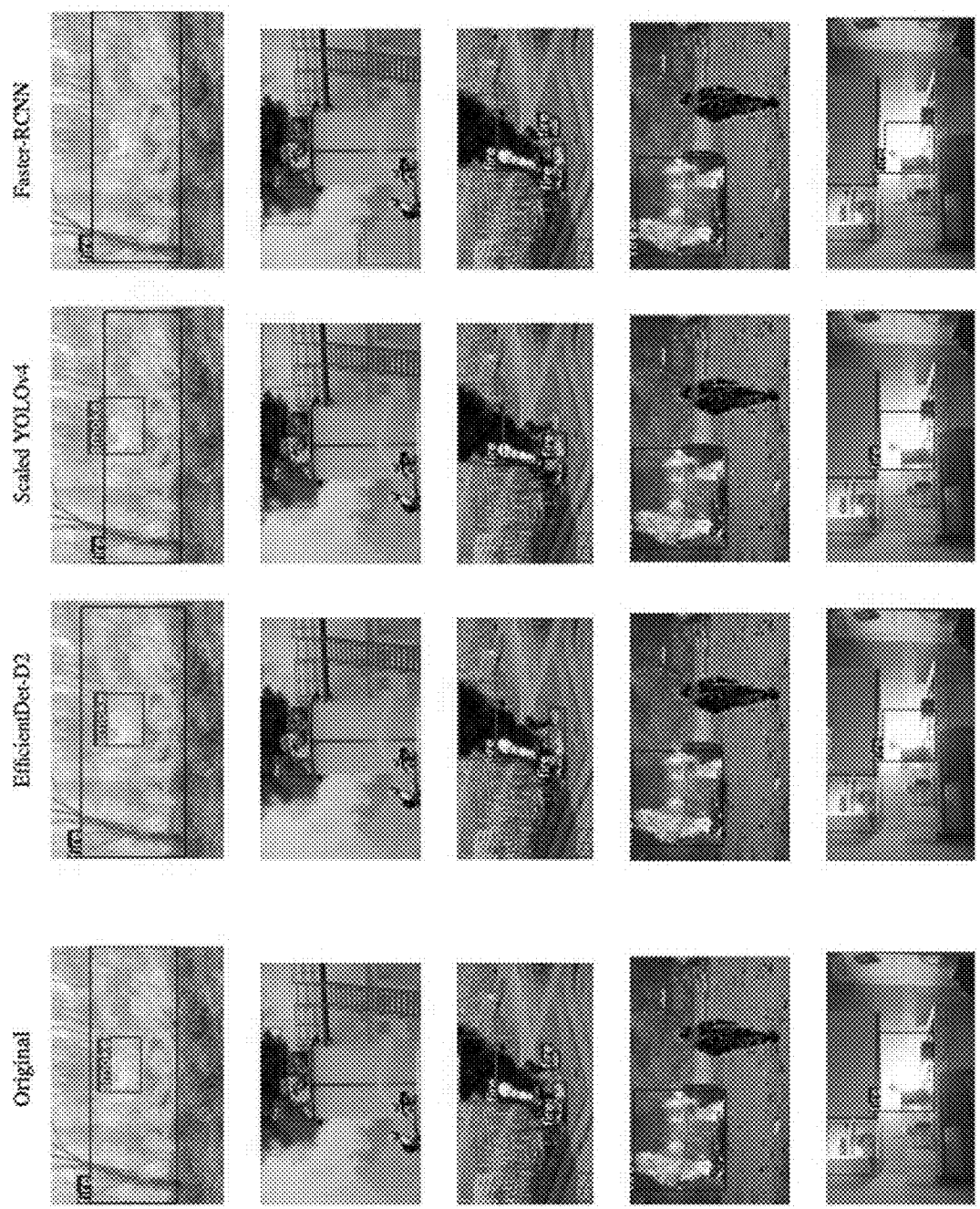
FIG. 11 is a matrix of images providing a comparison of the outputs obtained from EfficientDet-D2, Scaled YOLOv4, and Faster-RCNN with the original target images of different sizes and all five classes of fire.

FIG. 11 is a matrix of images providing a comparison of the outputs obtained from EfficientDet-D2 (second column), Scaled YOLOv4 (third column), and Faster-RCNN (fourth column) with the original target images (first column) of different sizes and all five classes of fire (first through fifth rows). The fire is depicted with a blue bounding box and the smoke is depicted with a red bounding box. As can be determined from this matrix of images, the fire and smoke detection with Scaled-YOLOv4 and EfficientDet-D2 is significantly better than Faster-RCNN.

§ 5.5 Conclusions

Example methods and deployments consistent with the present description provide improved fire and/or smoke detection. The inventors studied developed and studied state-of-the-art object detection AI models (namely, EfficientDet, Faster-RCNN, and YOLO) using a custom dataset of fire and smoke images that included all five classes of fire designated by NFPA. In comparison to Faster-RCNN, Scaled-YOLOv4 and EfficientDet-D2 are found to be more accurate, faster, and feasible for detecting fire and smoke in a given input image or video stream in real-time.

Example deployments provide an end-to-end IoT cloud-based system. These example deployments (1) receive real-time video streaming (RTSP/RTMP/SDP) from most CCTV systems and devices integrated with cameras, (2) extract the frames, (3) feed the extracted frames to multiple object detection models simultaneously, and (4) compute a probability for the presence of fire and/or smoke in inputs. Based on the risk thresholds and the custom criterion set in the system, the outputs are compiled programmatically into a video clip that can be sent to a user via email and/or messages, automatically, in real-time. Since the present description allows fires to be detected in their initial stages, immediate and appropriate actions may be taken. Such early detection of fire and appropriate response can mitigate the fire spread, enable firefighters to easily control and extinguish the fire, allow occupants to escape the structure immediately and away from the fire location, ease the search and rescue operation, reduce property damage, and avoid firefighter and civilian injuries and loss of lives.

What is claimed is:

1. A computer-implemented method comprising:
    a) receiving a video stream in at least the visible spectrum from at least one optical image camera;
    b) extracting frames from the video stream received from the at least one optical image camera;
    c) feeding only the entire unaltered optical image frames extracted from the video stream received from the at least one optical video camera as input into at least one object detection model that has been trained to detect at least one of fire and/or smoke to generate at least one detection output;
    d) processing the at least one detection output from the at least one object detection model to determine a probability of at least one of fire and/or smoke;
    e) determining whether or not the probability of at least one of fire and/or smoke meets a predetermined condition; and
    f) responsive to a determination that the probability of at least one of fire and/or smoke meets a predetermined condition, sending a user notification of an occurrence of fire and/or smoke,
    wherein the at least one object detection model is a neural network, the computer-implemented method further comprising:
        pre-training each of the at least one object detection model on a dataset including common objects in context; and
        training each of the at least one object detection model to detect at least one of fire and/or smoke in an ambient environment using a training set of visible spectrum images, at least some of which include smoke and/or fire in an ambient environment, with annotations bounding smoke and/or fire in the visible spectrum images, and
    wherein the training set of images includes a distribution of (i) Class A: Ordinary combustible materials, (ii) Class B: Flammable and combustible liquids, (iii) Class C: Class A or Class B involving energized electrical equipment, (iv) Class D: Combustible metals, and (v) Class K: Cooking appliance fires involving combustible cooking media.

2. The computer-implemented method of claim 1, wherein the act of processing the at least one detection output from the at least one object detection model to determine a probability of at least one of fire and/or smoke includes determining whether or not a predetermined number of consecutive frames of video include fire.

3. The computer-implemented method of claim 1, wherein the act of processing the at least one detection output from the at least one object detection model to determine a probability of at least one of fire and/or smoke includes determining whether or not a predetermined number of consecutive frames of video include smoke.

4. The computer-implemented method of claim 1, wherein the act of processing the at least one detection output from the at least one object detection model to determine a probability of at least one of fire and/or smoke includes determining whether or not a predetermined number of consecutive frames of video include both fire and smoke.

5. The computer-implemented method of claim 1, wherein the act of processing the at least one detection output from the at least one object detection model to determine a probability of at least one of fire and/or smoke includes
1) determining a bounding shape around smoke found in consecutive frames of video, and
2) Determining whether or not an area of the bounding shape is increasing over time.

6. The computer-implemented method of claim 1, wherein the act of processing the at least one detection output from the at least one object detection model to determine a probability of at least one of fire and/or smoke includes
1) determining a bounding shape around fire found in consecutive frames of video, and
2) Determining whether or not an area of the bounding shape is increasing over time.

7. The computer-implemented method of claim 1, wherein the act of processing the at least one detection output from the at least one object detection model to determine a probability of at least one of fire and/or smoke includes
1) determining a first bounding shape around fire found in consecutive frames of video,
2) Determining a second bounding shape around smoke found in consecutive frames of video, and
3) Determining whether or not areas of both the first bounding shape and the second bounding shape are changing over time.

8. The computer-implemented method of claim 1, wherein the user notification includes at least one image, or a link to at least one image from the extracted frames.

9. The computer-implemented method of claim 1, wherein the user notification includes at least one video clip, or a link to at least one video clip from the extracted frames.

10. The computer-implemented method of claim 1, wherein each of the at least one object detection model has hyperparameters which are evolved from initial values by trying to maximize a fitness score over a number of iterations.

11. The computer-implemented method of claim 1, wherein the at least one object detection model that has been trained to detect at least one of fire and/or smoke includes simultaneous detection processing by a first object detection model and a second object detection model,
wherein the act of determining whether or not the probability of the at least one of fire and/or smoke in at least one entire unaltered optical image frame from the at least one optical image camera meets a predetermined condition is performed by each of the first object detection model and the second object detection model, and
wherein the act of sending a user notification of an occurrence of fire and/or smoke is only performed responsive to
(A) both (1) a determination by the first object detection model that the probability of fire in at least one entire unaltered optical image frame from the at least one optical image camera meets a predetermined condition, and (2) a determination by the second object detection model that the probability of fire in at least one entire unaltered optical image frame from the at least one optical image camera meets a predetermined condition, or
(B) both (1) a determination by the first object detection model that the probability of smoke in at least one entire unaltered optical image frame from the at least one optical image camera meets a predetermined condition, and (2) a determination by the second object detection model that the probability of smoke in at least one entire unaltered optical image frame from the at least one optical image camera meets a predetermined condition, or
(C) both (1) a determination by the first object detection model that the probability of fire and smoke in at least one entire unaltered optical image frame from the at least one optical image camera meets a predetermined condition, and (2) a determination by the second object detection model that the probability of fire and smoke in at least one entire unaltered optical image frame from the at least one optical image camera meets a predetermined condition.

12. The computer-implemented method of claim 1, wherein the at least one optical image camera is of a closed-circuit television, a mobile phone, or a Web camera.

13. A system comprising:
a) at least one processor; and
b) a storage system storing processor-executable instructions which, when executed by the at least one processor, cause the at least one processor to perform a method including
1) receiving a video stream in at least the visible spectrum from at least one optical image camera,
2) Extracting frames from the video stream received from the at least one optical image camera,
3) Feeding only the entire unaltered optical image frames extracted from the video stream received from the at least one optical video camera as input into at least one object detection model that has been trained to detect at least one of fire and/or smoke to generate at least one detection output,
4) Processing the at least one detection output from the at least one object detection model to determine a probability of at least one of fire and/or smoke,
5) Determining whether or not the probability of at least one of fire and/or smoke meets a predetermined condition, and
6) Responsive to a determination that the probability of at least one of fire and/or smoke meets a predetermined condition, sending a user notification of an occurrence of fire and/or smoke,
wherein the at least one object detection model is a neural network, the method further comprising:
pre-training each of the at least one object detection model on a dataset including common objects in context; and training each of the at least one object detection model to detect at least one of fire and/or smoke in an ambient environment using a training set of visible spectrum images, at least some of which include smoke and/or fire in an ambient environment, with annotations bounding smoke and/or fire in the visible spectrum images, and wherein the training set of images includes a distribution of (i) Class A: Ordinary combustible materials, (ii) Class B: Flammable and combustible liquids, (iii) Class C: Class A or Class B involving energized electrical equipment, (iv) Class D:

Combustible metals, and (v) Class K: Cooking appliance fires involving combustible cooking media.

14. The system of claim 13 wherein the at least one processor includes multiple processors in a cloud web service.

15. The system of claim 13, wherein at least one processor includes multiple processors in devices that include or integrate
- streaming servers for receiving, in an automatically distributed, load-balanced manner, the video streams from distributed devices, encoding them to generate encoded video streams, and databasing the received streams,
- ingest servers for serving both (1) the encoded video streams from the streaming servers and (2) encoded video streams received directly from at least one Internet Protocol (IP) camera, upon request by a detection server,
- detection servers for determining the probability of at least one of fire and/or smoke, and eliminating the false alarms, and
- notification channels for alerting the user via at least one of email, text, and/or call.

16. The system of claim 13, wherein the at least one optical image camera is of a closed-circuit television, a mobile phone, or a Web camera.

17. A non-transitory computer readable medium or multiple non-transitory computer-readable medium storing processor-executable instructions which, when executed by at least one processor, cause the at least one processor to perform a method comprising:

a) receiving a video stream in at least the visible spectrum from at least one optical image camera;

b) extracting frames from the video stream received from the at least one optical image camera;

c) feeding only the entire unaltered optical image frames extracted from the video stream received from the at least one optical video camera as input into at least one object detection model that has been trained to detect at least one of fire and/or smoke to generate at least one detection output;

d) processing the at least one detection output from the at least one object detection model to determine a probability of at least one of fire and/or smoke;

e) determining whether or not the probability of at least one of fire and/or smoke meets a predetermined condition; and f) responsive to a determination that the probability of at least one of fire and/or smoke meets a predetermined condition, sending a user notification of an occurrence of fire and/or smoke, wherein the at least one object detection model is a neural network, the method further comprising:
- pre-training each of the at least one object detection model on a dataset including common objects in context; and
- training each of the at least one object detection model to detect at least one of fire and/or smoke in an ambient environment using a training set of visible spectrum images, at least some of which include smoke and/or fire in an ambient environment, with annotations bounding smoke and/or fire in the visible spectrum images, and wherein the training set of images includes a distribution of (i) Class A: Ordinary combustible materials, (ii) Class B:

Flammable and combustible liquids, (iii) Class C: Class A or Class B involving energized electrical equipment, (iv) Class D:

Combustible metals, and (v) Class K: Cooking appliance fires involving combustible cooking media.

18. The non-transitory computer readable medium or multiple non-transitory computer-readable medium of claim 17, wherein the at least one optical image camera is of a closed-circuit television, a mobile phone, or a Web camera.

* * * * *